United States Patent [19]

Mallan et al.

[11] E Re. 29,312

[45] Reissued July 19, 1977

[54] GASIFICATION OF CARBONACEOUS SOLIDS

[75] Inventors: George M. Mallan, Los Angeles; Leslie E. Compton, Claremont, both of Calif.

[73] Assignee: Occidental Petroleum Corporation, Los Angeles, Calif.

[21] Appl. No.: 737,279

[22] Filed: Nov. 1, 1976

Related U.S. Patent Documents

Reissue of:

[64] Patent No.: 3,846,096
Issued: Nov. 5, 1974
Appl. No.: 299,157
Filed: Oct. 19, 1972

U.S. Applications:

[63] Continuation-in-part of Ser. No. 153,358, June 15, 1971, abandoned.

[51] Int. Cl.[2] ..... C10J 3/16; C10J 3/46

[52] U.S. Cl. ..... 48/209; 48/202; 48/210; 252/373

[58] Field of Search ..... 48/202, 209, 210, 215; 252/373

[56] References Cited

U.S. PATENT DOCUMENTS

| | | | |
|---|---|---|---|
| 3,511,194 | 5/1970 | Stookey | 48/209 UX |
| 3,615,300 | 10/1971 | Holm | 48/202 X |
| 3,671,209 | 6/1972 | Teichmann et al. | 48/209 |
| 3,687,646 | 8/1972 | Brent et al. | 48/209 |
| 3,715,195 | 2/1973 | Tassoney et al. | 48/202 X |

*Primary Examiner*—R.E. Serwin
*Attorney, Agent, or Firm*—Christie, Parker & Hale

[57] ABSTRACT

A continuous process for converting particulate carbonaceous solids to gaseous hydrocarbons (from 1 to 7 carbon atoms per molecule of gas) by the rapid pyrolysis and in situ conversion of a portion of the pyrolysis product comprising heating a turbulent high velocity gaseous stream composed of carrier gas, carbonaceous solids and at least 2.0 weight percent water based upon the weight of carbonaceous solids and heating said stream in a pyrolysis zone at a temperature ranging from between about 1200° F. to about 2400° F. until at least a portion of said solids are converted to the desired gaseous hydrocarbons.

32 Claims, 1 Drawing Figure

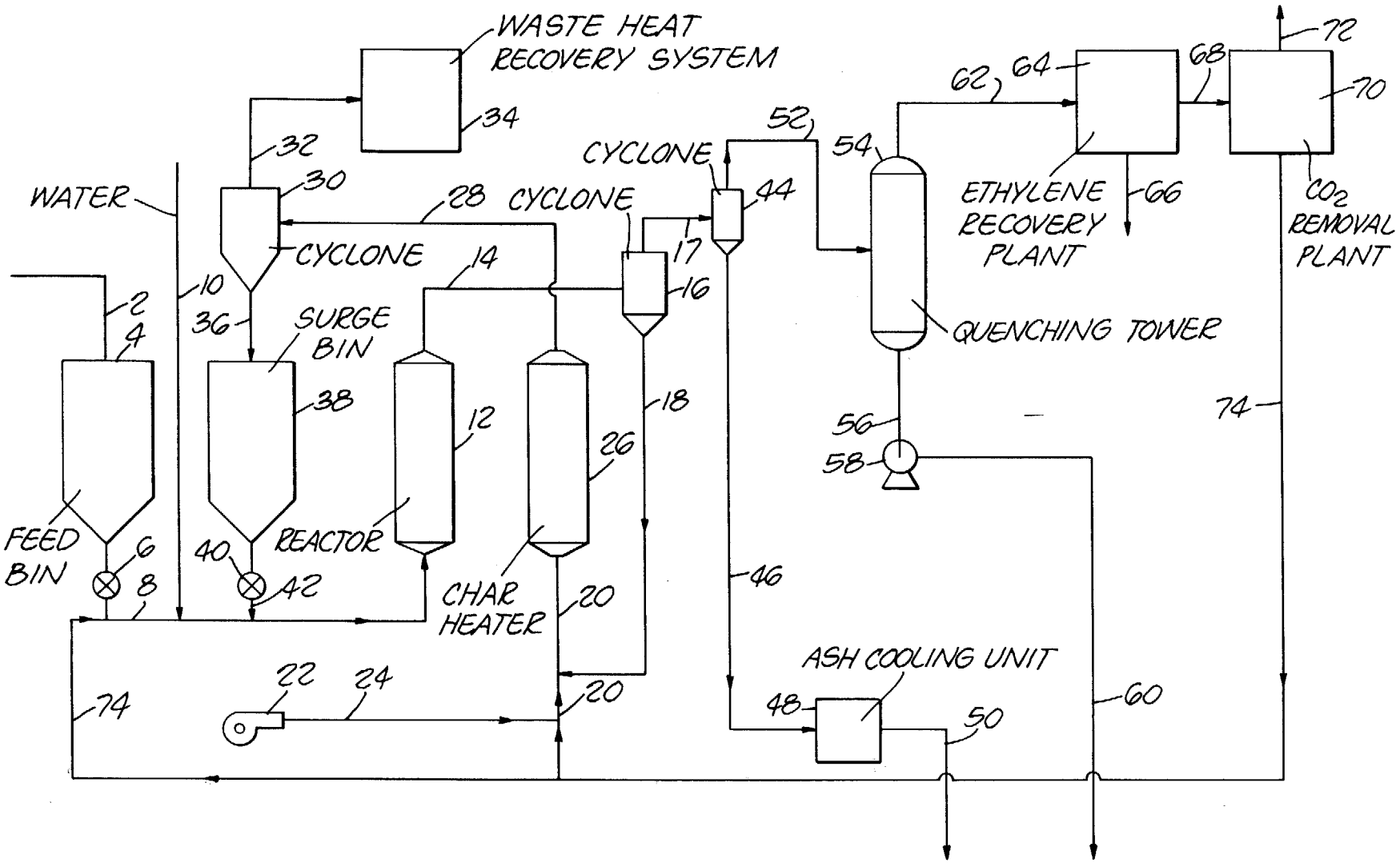
WASTE HEAT RECOVERY SYSTEM
34
32
30
CYCLONE
28
CYCLONE
CYCLONE
17
16
44
52
54
62
64
ETHYLENE RECOVERY PLANT
66
68
70
$CO_2$ REMOVAL PLANT
72
74
QUENCHING TOWER
56
58
46
48
ASH COOLING UNIT
50
60
18
20
20
26
CHAR HEATER
14
12
REACTOR
SURGE BIN
38
36
10
WATER
40
42
22
24
2
4
6
8
FEED BIN
74

GASIFICATION OF CARBONACEOUS SOLIDS

Matter enclosed in heavy brackets [ ] appears in the original patent but forms no part of this reissue specification; matter printed in italics indicates the additions made by reissue.

BACKGROUND OF THE INVENTION

This is a continuation-in-part of our pending application Ser. No. 153,358, filed June 15, 1971 on Gasification of Carbonaceous Solids now abandoned.

The art has long sought a continuous process for the conversion of carbonaceous materials such as coal and solid wastes containing organic material to gaseous hydrocarbons and/or petrochemical feed such as ethylene. The effort stems in part from increased interest in the use of such gas as a raw material for the synthesis of chemicals and liquid fuels, and in part from the need to develop methods for gasifying coal and solid wastes containing organic matter to ensure a long range supply of energy and chemicals in the form of gas. Gasification of such materials yields a product that can be handled with maximum convenience and minimum cost, and in addition greatly extends the uses to which such solid fuel sources may be put. Where solid wastes containing organic matter are gasified, there are the added ecological advantages of disposal of the wastes; by recycling them for use in the energy cycle thus adding to the total resources available.

In conventional processes for the conversion of carbonaceous materials to pipeline gas, a single reactor vessel is employed for the required conversion with the carbonaceous solids being pyrolyzed at high temperatures to cause it to release its volatilized hydrocarbons as a vapor within the vessel and these vapors are contacted with hydrogen while maintaining the reactants under high pressure and high temperature within the pyrolysis vessel to convert the volatilized hydrocarbons contained therein to pipeline gas. This system requires the use of pressure lock hoppers to feed carbonaceous solids into the reactor vessel and to remove solids from the vessel. The use of such hoppers greatly increases the cost of such systems. Further, carbonaceous material which has agglomerative tendencies must be prepared prior to being hydrogasified in order to prevent coking during the hydrogasification step.

The art has long sought a continuous flow process for the conversion of solid carbonaceous materials to gaseous hydrocarbon without the necessity of passing solid materials through pressure differentials.

Another problem facing us is the disposal of both industrial and domestic solids such as trash, rubbish, garbage, etc. is becoming an immense national problem. The cost of this service presently ranks third behind public schooling and highways as a municipal expense in the United States. The cost per unit of trash disposal and the number of units of trash per person is rising annually. It is estimated that each individual in the country generates between 4–6 pounds per day of solid waste, and that the industrial output is equivalent to approximately five pounds of solid waste per person per day. The cost of disposal varies from 5 to 30 dollars per ton of trash. Previous methods of trash disposal, such as land fill are becoming impossible whle others such as incineration are costly and result in air pollution problems. Less costly and more efficient disposal means for solid waste appear mandatory.

A second aspect of this problem is that the United States is consuming its natural resources especially natural gas at an ever increasing rate. In the normal materials utilization cycle, raw materials are collected, processed into useful products, utilized by consumers for varying spans of time, and then consigned to a presumably uncoverable wasteland, the city dump.

Because of these problems, many proposals have been put forth to utilize and recover values from solid wastes. Aluminum companies and glass companies will purchase used cans and bottles for reprocessing. Engineering studies and plant designs have been prepared to advance the concept of utilizing the heat produced by garbage incineration to operate electrical and desalination plants.

The idea of recovering metal values from waste solids is old in the art and is an integral part of the steel making industry.

However, the art must now develop processes to utilize both the metallic and non-metallic portion of waste solids as a raw material since these represent a large portion of the waste solids. Simple incineration of the organic portion of waste solids to produce utilizable heat is not the solution for several reasons. The off gases produced during incineration contain air pollutants, such as $SO_2$, $NO_x$, CO and ash. These pollutants must be trapped or diminished which requires costly devices such as electrostatic precipitators, scrubbers, etc. to avoid air pollution. In addition, organic waste solids are a poor fuel, and require very high combustion temperatures. What is needed is an efficient, economical method for handling the conventional waste solids produced by society which will recover chemical and fuel values from both the inorganic and organic portions of waste solids while substantially reducing the volume of gaseous effluent which must be treated to eliminate air pollution during processing.

The goal of totally recycling the raw materials contained in municipal solid wastes has become almost a "holy grail" to many members of our changing society. Although the idea is old, it was they who dramatized the quest, and when Congress passed the Solid Waste Disposal Act of 1965, the American people set their sights on the same goal. More recently, when Congress passed the Resource Recovery Act of 1970, the goal was more clearly defined and the quest may now receive significant taxpayer support. The end result should not only by a beautification of the American scene, but also a reduction in the financial drain on the taxpayer who is now asked to contribute toward the achievement of this goal. The present financial drain is truly staggering. In 1968, about $4.5 billion was spent by municipalities to collect, and either buy or burn our solid wastes. If something is not done to change waste elimination procedures, the cost estimates for 1980 range from $12.5 to $16.5 billion. Although about three quarters of these costs go for antiquated and difficult to change collection procedures, there is hope to significantly reduce, or even eliminate, the current disposal costs to the urban community.

At the present time, a significant amount of discarded raw materials is being recycled to the economy by many companies engaged in America's secondary materials industry. Large quantities of metals, an appreciable amount of paper, and some glass is being collected, upgraded and reused. However, except for tin and aluminum cans in some scattered areas of the nation, only a small fraction of our reusable resources are being recovered once they enter the municipal collection stream. A typical breakdown of municipal refuse is shown in the following Table 1, and up to now the difficult problem has been how to separate the vast amount of contaminated materials from the heterogeneous mass, and recover the potential values shown in this Table. In the past few years, American industry has tackled this problem, and answers are indeed beginning to come forth.

TABLE 1

[Recoverable materials in municipal solid wastes]

| Raw material | Composition, wt. percent | Estimated recovery eff., percent |
|---|---|---|
| Group 1: | | |
| Magnetic metals | 6–8 | 95 |
| Non-magnetic metals | 1–2 | 95 |
| Glass | 6–10 | 80 |
| Dirt and debris | 2–4 | 0 |
| Subtotal | | |
| Group 2: Paper products | 48–55 | 50 |
| Group 3: Unreclaimed paper and other organics. | ~55 | 100 |

We have invented a process which overcomes the above problems. The key to our process lies in converting the unuseable organic portion of solid carbonaceous wastes to gaseous chemical and fuel values using an efficient, low-cost, high capacity pyrolysis operation. Over one million cubic feet of gas can be obtained per ton of wet as-received municipal refuse. This process has been researched on a small continuous bench scale unit and in a pilot plant.

Our novel pyrolysis process is based upon the heating of shredded organic waste materials in the absence of air using a novel heat-exchange system. This method was developed to maximize gas yields and thus generate the maximum gas chemical and fuel value per ton of wastes. At the present time, organic chemical and fuel gas yields of greater than 40 weight percent are being obtained from oven-dried, inorganic-free feed material. This gas has an average heating value of from 900 to about 1100 B.t.u. standard cubic foot (s.c.f.) and can used as a replacement for pipeline gas. Pyrolysis of organic waste materials also produce char, condensable gases and a water fraction. The distribution of these products is the most important economic factor involved in commercial pyrolysis equipment. Most other prior art units produce relatively little organic gases unless high pressure hydrogeneration is employed. Aside from the organic liquid, or oil yields of 40 wt. percent obtained in a typical run, about 35% char, 10% gases and 15% water are also obtained. The gases and some of the char are used for a heat source in carrying out the process, and the oil and remaining char can be sold as a fuel or raw chemical.

The pyrolysis process is flexible with regard to feed materials. So far, the following waste products have been converted to useful chemical and fuel values: municipal solids wastes, tree bark, rice hulls, animal feed lot wastes, and shredded automobile tires. In the case of tires, a char is produced which is recyclable into new tire manufacturing as carbon black. Tests conduced on this product shows that [moduls] *modulus* of elasticity and tensile strength of the compounded rubber approach to within 75 to 85% of the properties obtained when general purpose carbon black is used.

SUMMARY OF THE INVENTION

It is the purpose of this invention to provide an efficient economical method of recovering gaseous chemical values from solid wastes, thereby not only eliminating or greatly reducing the volume of the waste solids, but also having the added economic advantage of recovering chemical and fuel values from solid wastes for recycling into the economy as raw materials and which also will facilitate the segregation and recovery of metallic values from the inorganic portion of conventional solid wastes.

This invention is directed to an efficient economical process for producing gaseous hydrocarbons containing from 1 to 7 carbon atoms per molecular of gas, which gaseous hydrcarbons are useful as heating fuels or petrochemical feedstocks i.e., ethylene. This invention is directed to a process for recovering chemical and fuel values from conventional waste materials. The waste materials being composed of both organic and inorganic solids which solids are capable of being divided into discreet particles by comminuting the waste material solids until the particle size of said waste material has a maximum particulate dimension of less than 1.0 inch. The process comprises forming a high velocity turbulent gaseous stream composed of a pyrolysis carried gas, particulated waste solids, water and hot particulate char in a pyrolysis zone, such that the particles of waste solids, char particles and water are intimately admixed and entrained within the gaseous portion of the stream; heating the waste material in said stream to a temperature of from between about 1200 and about 2200° F. in the pyrolysis zone, the residence time of said waste solids in said zone being less than 10 seconds; removing the product stream from the pyrolysis zone; and separating and independently recovering volatilized products and solids from said product stream. In our novel process, organic chemical values in the waste solids are volatilized and pyrolyzed by heat to organic chemical and fuel values which are eluted from the organic solids by vaporization and rapidly removed therefrom to minimize thermal decomposition of these values. The organic chemical and fuel values emerging from the pyrolysis zone of our process can be readily separated from the inorganic portion of the pyrolyzed waste solids by conventional classification systems. Our novel process can be beneficially utilized to recover chemical values from waste solids which are essentially organic in nature. The organic chemical effluent from the pyrolysis zone contains a raw material for further processing in accordance with the teachings of this invention. The volatile organic values, which are a valuable raw material, can be separated from the product and carrier gas and further treated to produce useful products. The metallic values in the segregated inorganic solids can be recovered therefrom by conventional processing.

In a preferred embodiment of our invention the gaseous stream contains from about 7.0 to about 18.0 weight percent water and is heated until a substantial portion of the carbonaceous solids contained therein is converted to ethylene (greater than 20 weight percent) with the remainder of the gaseous hydrocarbons being utilized to process heat for the pyrolysis zone. Thus, there is provided an efficient economical method of recycling solid carbonaceous material i.e., municipal trash, industrial and agricultural waste products, etc. as valuable raw materials.

BRIEF DESCRIPTION OF THE DRAWING

The drawing shows in schematic outline an arrangement of equipment for carrying out the novel processes of this invention.

DETAILED DESCRIPTION OF PREFERRED EMBODIMENTS

This invention is concerned with the production of gaseous hydrocarbons for use as a source of fuel and/or as a raw material in chemical processing. Such gas is composed preferentially of ethylene, methane, and hydrogen and can contain other gaseous hydrocarbons having from 1 to 7 carbon atoms; i.e., methane, ethane, propane, butane, etc. which do not interfere with its intended use. The gas produced by our novel process can be treated by conventional processes to remove any impurities which are deemed undesirable, i.e., sulfur compounds, carbon dioxide, carbon monoxide, etc.

In effect our process is a one stage process having several chemical processes effected sequentially in the single stage, namely devolatization of the carbonaceous solids, cracking of the volatiles, water-gas-shaft reactions on the residual carbonaceous solids and hydrogenation of the cracked volatiles.

In this invention we are dealing with the carbonaceous materials of conventional solid wastes containing organic matter produced in our society. Municipal solid wastes can contain the widest variety of ingredients, e.g., glass, metal, water, organic products such as paper, automobile tires, plastics, vegetable and animal material, etc. Industrial wastes include rubber, plastics, agricultural wastes manure, waste wood products, cannery wastes, etc. While our process can handle conventional waste solids without prior segregation of the inorganic matter therefrom; preferably the inorganic materials are segregated from the waste solids and only that portion of the waste solids which is composed substantially or organic (carbonaceous) materials or matter is treated by the present process. The degree of segregation of organic matter from the original waste solids is variable, since total segregation may impose uneconomical cost factors on the overall process. Waste solids can be segregated by using conventional separation equipment and processes.

The waste solids segregated or unsegregated, are comminuted to a particulate found useable in our invention wherein the maximum dimension of the particles is no greater than one inch, and in the preferred embodiment of our invention the particles of the comminuted waste solids have a maximum dimension of 0.25 inch or less. By the term "maximum dimension" is meant the largest dimension, e.g. either length of width or thickness, of the individual which should exceed this upper limit may have smaller dimensions and can consist of chunks having essentially three dimensions, pieces of paper, plastic film, plant leaves having essentially two dimensions and/or strips of material which are essentially one dimension e.g., organic filaments. The size and shape of the particles as well as the density will affect the pressure drop within the system and the heat transfer into the particles which will necessitate adjustments of residence times within the pyrolysis zone to insure that the particles of organic matter are heated to the desired reaction temperature in the zone. For this reason we deem it preferable that the waste solids be comminuted and intermixed to produce a substantially uniform mixture.

The amount of water to be added in our process is of course dependent on the nature of the carbonaceous materials processed, but at least 2 weight percent of water based on the weight of carbonaceous solids is present. In general we have found that from about 7.0 to about 18.0 weight percent water based upon the weight of carbonaceous solids being treated gives beneficial results. The required water can be separately injected into the stream as it is formed or it can be added to particles prior to formation of the stream.

An essential feature of this invention is the heating of the organic waste solids to a temperature of from about 1200 to about 2500° F. preferably from about 1400 to about 1600° F. while the waste solids are entrained in a turbulent gaseous stream composed of carrier gas, waste solids, water and hot particulate char. The stream is contained within a pyrolysis zone for a period of less than 10 seconds preferably from about 0.1 to about 0.6 seconds. In general we have found that organic waste solids from municipal sources can be advantageously treated by the process of our invention by heating the organic waste solids to a temperature of from between about 1400 to about 1600° F. in the pyrolysis zone with a residence time ranging between 0.1 to 2 seconds. The relationship between temperature and residence time can be varied to optimize yields of the gaseous organic chemical and fuel values. If the temperature and/or residence times are too low, the vaporization and pyrolysis of the solid waste is incomplete. When the temperature and/or residence time is too high, the pyrolysis products are degraded giving high yields of carbon monoxide, hydrogen and carbon dioxide and low yields of the desired gaseous chemical and fuel values.

By the term turbulent stream is meant a stream of gas flowing through a pyrolysis zone, e.g., a pipe shaped reactor vessel, wherein the flow is turbulent in nature, e.g., having a Reynolds flow index number greater than 2000 preferably [about] *above* 2500.

In operation, a low ratio of about 0.2 to about 2.0 pounds of mixed gases to each pound of waste solids is all that is required to obtain a Reynolds flow index number of 2000 or greater when the pyrolysis chamber has a diameter of 3 inches or greater. For example, with a 10 inch diameter chamber, about 0.7 pounds of gas for each pound of solids is all that is required to maintained a turbulent flow in the chamber. Laminar flow in the pyrolysis zone must be avoided because a flow system would tend to severely limit the contact between the char, water and carbonaceous material and rate of heat transfer within the pyrolysis zone. In the normal practice of this invention the carrier gas, water, hot char and waste solids are introduced into one end of the pyrolysis vessel and rapidly intermixed and dynamically contacted with each other and blown through the vessel to permit the requisite heat transfer to take place. The heat required to pyrolyze the organic matter and remove the volatile organic chemical values can be provided all or in part from the sensible heat in the char particles, preferably all the heat is supplied by hot char. From about 2 pounds to about 10 pounds of hot char is used for each pound of solid waste. The use of hot char as the heat source in the pyrolytic zone has many advantages. Because of its heat capacity and density, a much lower volume of char is needed to heat the solid waste than would be the case if hot carrier gas alone was used. The hot char comes in intimate contact with solid waste in the turbulent gaseous stream for efficient heat transfer. The water, in the form of steam can also furnish some of the reaction heat.

The carrier gases found useable in this invention to effectuate the thermal elution of the waste solids particles should not oxidize the char, organic matter and organic chemical values form during pyrolysis. Thus the gas stream should be substantially free of air, oxygen, and the like, that is the stream should contain less than 4% by volume oxygen, preferably less than 1% by volume oxygen. The amount of oxygen is minimized to minimize oxidation of organic values including the liquid chemical and fuel values. Exemplary of gases suitable for use as carrier gases in our invention are, nitrogen, argon, $CH_4$, $H_2$, carbon monoxide, flue gases, carbon dioxide steam and any other gas which will not deleteriously react with or oxidize the organic portion of the matter within the system. In a preferred embodiment of our invention we recycle the carrier gas back to the pyrolysis zone after the organic chemical values are removed therefrom.

The particulate char is added to the waste solids in the preferred operation of our invention to provide all or a portion of the heat required for thermal elution. The selection of an optimum char-to-waste solids weight ratio will of course be dependent upon the heat transfer requisites of the system. Since part of the heat of pyrolysis can be supplied by the carrier gas and steam, the temperature, flow rate and residence time in the reactor can be calculated by well known methods for a particular system. In general, for economy's sake we prefer to utilize the char particles for the main source of heat for the pyrolysis due to their density and the beneficial heat transfer coefficients built into the system. Heat energy can also be furnished to the pyrolysis zone by indirect means such as electrical heating through the zone wall.

The pyrolysis portion of the system is designed to rapidly heat the carbonaceous particles to a temperature ranging from 1200° to 2500° F. to recover the maximum amount of volatiles therefrom, preferably between a temperature of from about 1400° F. to about 2200° F. The selection of a particular temperature in this range will of course be dependent upon the particular organic waste solids employed and the residence time of the waste solids in the pyrolysis zone.

The effluent from the pyrolysis zone is composed of char, volatilized organic fuel and chemical values, product gas, and carrier gas. The volatilized organic fuel and chemical values are cooled to a temperature below the temperature of pyrolysis to minimize degradation of the organic chemical values. The char solids can be readily separated therefrom by any conventional solids/gas separator such as a cyclone and the like. The volatilized organic chemical values and carrier gas can be separated and recovered by conventional separation and recovery means. When the waste solids passed through the pyrolysis zone contain inorganic matter such as metal and glass particles intermixed with the char produced by the organic portion of the waste solids, the organic and inorganic solids can be readily separated by conventional air classification system. In fact the pyrolysis of the organic solids increases the density differential between such solids and actually facilitates the separation. However, the solids containing both inorganic and organic solids can be recycled through the pyrolysis zone to provide the necessary heat without prior separation. When the pyrolyzed solids are separated, the latent heat found in the inorganic solids is utilized to provide heat for the pyrolysis zone in order to increase the efficiency and economics of the system e.g., the heat of the inorganic solids can be used to heat the recycle gases. Alternately, the inorganic solids can be separated from the char by conventional means if desired. Of course it will be obvious to those skilled in the art that the hot inorganic solids recovered from our invention are in an excellent form and condition for further processing by conventional processes to recover metallic or inorganic chemical values therefrom and that this factor adds further attractive economics to our novel process.

By the term volatilized hydrocarbons as used in this application is meant the product gases produced by pyrolysis of the waste solids and in general these consist of saturated and unsaturated hydrocarbons having from 1 to 7 carbon atoms and lesser amounts of carbon dioxide, carbon monoxide and hydrogen. The product gas stream also contains undesirable gaseous products such as $NH_3$, HCl, $H_2S$ and water which should be removed from the product gas stream by conventional means such as cooling and chemical scrubbing, etc.

Initially the system is started up by using hot char from other sources, but after waste solids have been pyrolyzed as described herein, sufficient hot char is produced as required by the system, and in fact is produced in excess. The excess char can be readily utilizable in further processing to providing new materials, which enhances the total economics of our process, such as fuel for use in a power plant or a raw material source for the chemical industry. These excess char can be briquetted by conventional means and utilized as a source of fuel or coke.

The excess char particles produced by our novel process can also be degasified, if desired, by heating to temperatures ranging from about 1200° F. to 1800° F. or higher to yield a hydrogen-rich gas which is saleable as premium fuel. The gas can be upgraded into pure hydrogen, or used for hydrotreating the heavier volatilized chemical values produced during the present process.

Char degasification can be carried out in several ways which, in substance, amounts to direct or indirect heating. In direct heating, the char is contacted with sufficient oxygen from a suitable source, such as air, to bring the stream by controlled combustion up to the desired degasification temperature. This can be accomplished in a transport reactor similar to the pyrolysis reactor or in a fluidized bed reactor.

Preferably, the char is degasified by indirect heating which yields a gas stream containing 70 or more percent by volume hydrogen. This may be accomplished in a reactor similar to a tubular heat exchanger in which the char is blown through the tubes in a dense or dilute phase and fuel is burned with air or another suitable source of oxygen in adjacent tubes to supply the heat required for degasification.

Alternatively, the same result can be accomplished by the combustion of the fuel in tubes located in a fluidized bed of the char. After separating the char from the evolved gases, the char is cooled for ultimate use as a high grade fuel.

Where it is desired to produce a low sulfur char, from waste solids containing large amounts of sulfur, sulfur reduction can be accomplished during pyrolysis, superheating and/or degasification of the resultant char.

Desulfurization during pyrolysis can also be achieved by having a solid sulfur acceptor, such as lime or iron oxide, present in the zone during pyrolysis. The sulfur combines with iron oxide to form pyrrhotite. Both are iron oxides, and pyrrhotite is magnetic and can be removed, in addition to any iron pyrite naturally present, from the product char by magnetic separation. This can conveniently be accomplished with a minimum cooling of the char to conserve the heat requirements for processing.

Desulfurization may also be achieved during pyrolysis by enriching the gas stream with hydrogen, preferably part of the hydrogen released during degasification. The hydrogen fed to pyrolysis zone reacts with sulfur to form hydrogen sulfide which is later removed by conventional means such as scrubbing; hydrogen also enriches the volatilized hydrocarbons. In the preferred embodiment of our invention we use a carrier gas containing at least 20 parts by volume hydrogen based upon the total volume of carrier gas used.

Desulfurization may also be achieved by superheating the char by employing as the transport gas, a gas enriched with hydrogen. This gas reacts with the sulfur in the char to achieve additional sulfur reduction of the product char. As with desulfurization during pyrolysis, the hydrogen employed obtained by the recycle of off gases from char degasification before or after purification.

Where it is desired to recover the sulfur from the product char, the char which is already at an elevated temperature is merely heated to about 2300° to 2800° F. at ambient pressures in the non-oxidizing environment for periods up to about 20 minutes. This results in substantial sulfur reductions from the char.

When the char is degasified by indirect heating, maintaining pressure at from about 50 to about 100 p.s.i.a. and using a hydrogen-rich transport gas enhances additional sulfur removal during degasification. Under these conditions char can be desulfurized as well as degassed within reactor times of about ten minutes. This desulfurization can be achieved since the inorganic sulfur has been essentially removed by the sulfur acceptor in previous treatment.

The following description of the drawing teaches a typical example of the present process and is not intended to be a limitation thereof.

As shown in the Figure, the particulate carbonaceous solids enter the boundary of the unit through line 2, and pass into feed bin 4 for surge storage. Therein the feed is purged of oxygen by vacuum or an oxygen free gas streams purge, such as a nitrogen, carbon dioxide or carrier gas stream. The feed is then metered into the system through a gas tight valve 6 into line 8, through which passes sufficient recycle gas to transport the particulate solids through the rest of the pyrolysis system at the proper operating velocity. The recycle gas and particulate carbonaceous solids then picks up sufficient water from line 10 to complete the required water-gas-shift reaction. Optionally water as steam can be passed directly into pyrolysis reactor 12, preferably heated to a temperature near the desired pyrolysis temperature. Sufficient hot char to provide the heat to carry out the pyrolysis reaction is added through line 42. The reaction takes place in reactor 12 where the temperature is raised to between 1,200 and 2,400° F. The residual char and hot gases from the reactor are removed through line 14, and the solids are separated from the hot gases in cyclone 16. The new char produced in reactor 12 is of a size large enough to be removed in cyclone 16. The original hot char is reduced to an ash of a smaller size which can be classified and separated when passed into cyclone 44. The new char it passed out of cyclone 16 through line 18 where it joins line 20 carrying air and recycle gas into char heater 26. After the new char is burned to a sufficiently high temperature in char heater 26, it is passed out through line 28 where the hot char is removed from the combustion gases in cyclone 30. Less than a stoichiometric amount of oxygen is used to provide that the heated char gas stream contains substantially no oxygen after combustion in heater 26. These gases leave through line 32 and pass into a waste heat recovery system 34. The hot char passes through line 36 into a surge bin 38 where it is temporarily stored and fed into the pyrolysis system through metering valve 40 and line 42 to join line 8 containing the pyrolysis feed materials. This waste ash product from cyclone 44 leaves through line 46, is cooled in ash cooling unit 48 and removed from the system through line 50. The product gases of the pyrolysis reaction leave cyclone 44 through line 52 and are quenched in quenching tower 54 with water inert solvent and/or inert gas. The condensables are mostly water and a small amount of organic liquids which leaves the quench system through line 56 and is pumped through pump 58 into line 60 for disposal and/or recovery via conventional facilities (not shown). The cooled product gases leave the quench tower 54 through line 62 and high quality ethylene is removed in a conventional ethylene recovery plant 64. Product ethylene serves the system through line 66. The remaining product gases are passed through line 68 into a conventional carbon dioxide removal plant 70. The waste carbon dioxide is vented from the system through line 72. The remaining gases consist primarily of carbon monoxide, methane, hydrogen, small quantities of ethane and C3 to C7 hydrocarbons. These gases leave the carbon dioxide plant through line 74 and are recycled back into the system. A portion of the recycled gas can be fed directly into the char heater through line 20, where it picks up air required for combustion through compressor 22 and line 24. The remaining gases join the pyrolysis feed materials in line 8 and are recycled through the pyrolysis reactor being utilized as carrier gas and where they are used as feedstock to produce more ethylene.

EXAMPLE

To illustrate the effect of our novel process, a comminuted sample of municipal waste from Middletown, Chio was pyrolyzed at a temperature of 1400° F. Prior salvaging was conducted on the sample, removing nearly all metal, glass and other inert materials, and about 50% of the paper fibers.

The primary organic residue of this municipal solid waste was continuously fed into the pyrolysis reactor zone at about three pounds per hour, and the particle size ranged from about 50 mesh to ½ inch. The turbulent stream in the reactor zone contained 7.2 weight percent water based upon the weight of the carbonaceous material in the stream.

Table 1 given as follows shows an analytical breakdown of the components of the wastes used in this example.

TABLE 1

Analysis of Oven-Dried Hydropulped Municipal Solid Waste from Middletown, Ohio

| Component: | Weight percent |
|---|---|
| Carbon | 46.1 |
| Hydrogen | 7.7 |
| Sulfur | 0.07 |
| Nitrogen | 0.65 |
| Chlorine | 0.13 |
| Ash | 6.5 |
| Oxygen (by difference) | 39.85 |

NOTE: Over 90% of the inert, inorganic materials were removed by the Black Clawson Company prior to pyrolysis.

Table 2 given as follows shows an analysis of the products produced upon gasification of carbonaceous materials utilizing the process of this invention.

TABLE 2

[Products of gasificaton pyrolysis]

| | | |
|---|---|---|
| Gas fraction, 86 wt. percent; heating value 770 Btu/ft$^3$. | | |
| 1.2 wt. percent | 16.7 mol. percent | Hydrogen. |
| 10.0 wt. percent | 15.4 mol. percent | Methane. |
| 1.1 wt. percent | 1.3 mol. percent | Ethane |
| 21.6 wt. percent | 20.9 mol. percent | Ethylene. |
| 3.7 wt. percent | 2.3 mol. percent | Propane & propylene. |
| 0.4 wt. percent | 0.3 mol. percent | $C^4$ hydrocarbons. |
| 4.8 wt. percent | 2.1 mol. percent | $C^5$ to $C^7$ hydrocarbons. |
| 18.4 wt. percent | 17.9 mol. percent | Carbon monoxide |
| 38.8 wt. percent | 23.1 mol. percent | Carbon dioxide |
| Char fraction, 7 wt. percent . | | |
| 39.4 wt. percent | | Carbon. |
| 1.4 wt. percent | | Hydrogen. |
| 1.0 wt. percent | | Nitrogen. |
| 0.4 wt. percent | | Sulfur. |
| 54.1 wt. percent | | Ash. |
| 0.5 wt. percent | | Chlorine. |
| 3.2 wt. percent | | Oxygen (by difference). |
| Liquid fraction, 7 wt. percent; pH ~3.5. | | |
| Over 90.0 wt. percent | | Water. |
| Over 0.4 wt. percent | | Sulfur. |
| Over 0.7 wt. percent | | Nitrogen. |
| Over 0.04 wt. percent | | Chlorine. |
| Also contains | | Acetaldehyde, acetic acid, acetone, formic acid, fufural, methanol, phenol, etc. |

It will be obvious to anyone skilled in the art that our novel process provides an efficient economical process not only of eliminating solid wastes but also provides a source of valuable raw materials for the chemical industry. Thus, it transforms a problem into a benefit. Based on the results obtained in the example it is projected that a plant utilizing our novel process to process 2000 tons per day of municipal trash would produce 150 million pounds of ethylene per year at 86% conversion to gas with the process heat being supplied by the non-ethylene portion of the said gas.

What is claimed is:

1. A process for producing gaseous hydrocarbons having from 1 to 7 carbon atoms from solid carbonaceous material comprising:

a. Forming a turbulent gaseous stream composed of carrier gas, water, char, and particulate carbonaceous solids, said solids having an individual maximum particle dimension of less than 1.0 inch, such that the solids and water are intimately admixed and entrained within the gaseous portion of the stream; said water being present in said stream in an amount which is at least 2.0 weight percent based upon the amount of carbonaceous solids in said stream; said carrier gas containing less than 1% by volume of oxygen;

b. Heating the components of said stream to a temperature ranging from between about 1200° F. and about 2500° F. in a pyrolysis zone for a predetermined residence time so that at least a portion of said carbonaceous solids are converted to gaseous hydrocarbons, containing from 1 to 7 carbon atoms, ethylene comprising at least 20% by volume of said gaseous hydrocarbons;

c. Removing the product stream from the pyrolysis zone;

d. Recovering the gaseous hydrocarbon products.

2. The process of claim 1 wherein the said gaseous stream contains from about 7 to about 18 weight percent water, based upon the weight of carbonaceous solids in the stream.

3. The process of claim 2 wherein said gaseous stream is heated to a temperature ranging from between 1400° F. to about 1600° F. in said pyrolysis zone.

4. The process of claim 1 wherein said stream is heated to a temperature of about 1500° F. in said pyrolysis zone.

5. The process of claim 1 wherein the residence time of the carbonaceous solids in said pyrolysis zone is less than 5 seconds.

6. The process of claim 1 wherein the carbonaceous solids are municipal waste material, sewage sludge, rubber tire scrap, agricultural wastes, manure, crop residue, food processing wastes, industrial wastes, lignocellulose products, and mixtures thereof.

7. The process of claim 2 in which the carbonaceous solids are municipal waste materials.

8. The process of claim 2 wherein said carbonaceous solids are [muniuipal] *municipal* waste material, manure, sewage sludge, rubber tire scrap, food processing wastes, agricultural wastes, industrial wastes, lignocellulose products, and mixtures thereof.

9. The process of claim 2 wherein the gaseous hydrocarbons are separated into their component parts.

10. The process of claim 1 wherein the gaseous hydrocarbons produced consist substantially of ethylene.

11. The process of claim 1 wherein a substantial portion of the heat required for pyrolysis of the carbonaceous solids is supplied by utilizing heated char in the gaseous stream.

12. The process of claim 1 wherein a portion of the heat required in the pyrolysis zone is supplied by indirect heating means to heat the carbonaceous solids.

13. The process of claim 2 wherein said carbonaceous solids are rubber scrap.

14. The process of claim 2 wherein a portion of the solids recovered from the product stream is separately heated to a temperature ranging from between about 1500° F. to about 2400° F. and thereafter is recycled through the pyrolysis zone as hot char in the gaseous stream to supply a substantial portion of the heat required in the pyrolysis zone to heat the carbonaceous solids.

15. The process of claim 14 wherein sufficient amounts of heated char are utilized to provide substantially all of the heat required to heat the carbonaceous solids in the pyrolysis zone.

16. The process of claim 14 wherein the carrier gas is a hydrogen enriched gas stream.

*17. A process for producing gaseous hydrocarbons having from 1 to 7 carbon atoms from solid carbonaceous material comprising:*

*a. Forming a turbulent gaseous stream composed of carrier gas, water, char, and particulate carbonaceous solids, said solids having an individual maximum particle dimension of less than 1.0 inch, such that the solids and water are intimately admixed and entrained within the gaseous portion of the stream; said water being present in said stream in an amount which is at least 2.0 weight percent based upon the amount of carbonaceous solids in said stream; said carrier gas containing less than 1% by volume of oxygen;*

*b. Heating the components of said stream to a temperature ranging from between about 1200° F. and about 2500° F. in a pyrolysis zone for a predetermined residence time so that at least a portion of said carbonaceous solids are converted to gaseous hydrocarbons, containing from 1 to 7 carbon atoms;*

*c. Removing the product stream from the pyrolysis zone;*

*d. Recovering the gaseous hydrocarbon products.*

*18. The process of claim 17 wherein the said gaseous stream contains from about 7 to about 18 weight percent water, based upon the weight of carbonaceous solids in the stream.*

*19. The process of claim 18 wherein said gaseous stream is heated to a temperature ranging from between 1400° F. to about 1600° F. in said pyrolysis zone.*

*20. The process of claim 17 wherein said stream is heated to a temperature of about 1500° F. in said pyrolysis zone.*

*21. The process of claim 17 wherein the residence time of the carbonaceous solids in said pyrolysis zone is less than 5 seconds.*

*22. The process of claim 17 wherein the carbonaceous solids are municipal waste material, sewage sludge, rubber tire scrap, agricultural wastes, manure, crop residue, food processing wastes, industrial wastes, lignocellulose products, and mixtures thereof.*

*23. The process of claim 18 in which the carbonaceous solids are municipal waste materials.*

*24. The process of claim 18 wherein said carbonaceous solids are municipal waste material, manure, sewage sludge, rubber tire scrap, food processing wastes, agricultural wastes, industrial wastes, lignocellulose products, and mixtures thereof.*

*25. The process of claim 18 wherein the gaseous hydrocarbons are separated into their component parts.*

*26. The process of claim 17 wherein the gaseous hydrocarbons produced consist substantially of ethylene.*

*27. The process of claim 17 wherein a substantial portion of the heat required for pyrolysis of the carbonaceous solids is supplied by utilizing heated char in the gaseous stream.*

*28. The process of claim 17 wherein a portion of the heat required in the pyrolysis zone is supplied by indirect heating means to heat the carbonaceous solids.*

*29. The process of claim 18 wherein said carbonaceous solids are rubber scrap.*

*30. The process of claim 18 wherein a portion of the solids recovered from the product stream is separately heated to a temperature ranging from between about 1500° F. to about 2400° F. and thereafter is recycled through the pyrolysis zone as hot char in the gaseous stream to supply a substantial portion of the heat required in the pyrolysis zone to heat the carbonaceous solids.*

*31. The process of claim 30 wherein sufficient amounts of heated char are utilized to provide substantially all of the heat required to heat the carbonaceous solids in the pyrolysis zone.*

*32. The process of claim 30 wherein the carrier gas is a hydrogen enriched gas stream.*

* * * * *

UNITED STATES PATENT AND TRADEMARK OFFICE

CERTIFICATE OF CORRECTION

PATENT NO. : Re. 29,312

DATED : July 19, 1977

INVENTOR(S) : GEORGE M. MALLAN and LESLIE E. COMPTON

It is certified that error appears in the above-identified patent and that said Letters Patent are hereby corrected as shown below:

Column 1, line 47, for "prepared" read -- pretreated --. Column 2, line 50, for "by" read -- be --; line 55, for "buy" read -- bury --. Column 3, line 44, after "can" read -- be --; line 51, for "hydrogeneration" read -- hydrogenation --; line 64, for "conduced" read -- conducted --. Column 4, line 29, for "molecular" read -- molecule --; line 40, for "carried" read -- carrier --. Column 7, line 11, after "with" read -- the --; line 18, for "form" read -- formed --. Column 8, line 39, for "providing" read -- provide --. Column 9, line 45, for "50" read -- 15 --. Column 10, line 60, for "Chio" read -- Ohio --.

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*